3,189,428
METHOD FOR INHIBITING PLANT GROWTH
Dorsey R. Mussell, Clare, Mich., assignor to The Dow Chemical Company, Midland, Mich., a corporation of Delaware
No Drawing. Filed June 4, 1962, Ser. No. 199,651
7 Claims. (Cl. 71—2.2)

This invention is concerned with the alteration or modification of the growth of vegetation and is particularly concerned with the suppression of the growth of undesirable vegetation and with compositions and methods for the control of the growth of germinant seeds, emerging seedlings and established plants of many undesirable weed species.

It is an object of the present invention to provide a new and improved method for altering or modifying the growth of vegetation. Another object is the provision of a new and improved method for the control of the growth of undesirable vegetation. An additional object is the provision of a novel composition adapted to be employed for the accomplishment of the new method of growth alteration. Other objects will become apparent from the following specification and claims.

According to the present invention, it has been discovered that the growth of plants can be altered or modified by exposing plants and plant parts to the action of, or by treating plants and plant parts and their habitats with hexafluoroarsenic acid or hexafluorophosphoric acid or their salts. The acids are characterized by the following formulae respectively

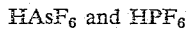

$HAsF_6$ and $HPF_6$

Representative salts to be employed according to the present invention are the salts with ammonium or other nitrogen-containing inorganic cations, metals, and organic compounds such as aliphatic or aromatic amines, and nitrogen-containing heterocyclics. More particularly, then it has been discovered that the growth of germinant seeds, seedlings and established vegetation is suppressed by exposing the germinant seeds, seedlings or the roots or above-ground portions of the growing plants to the action of a growth-inhibiting amount of at least one of the present hexafluoro compounds.

These toxic compounds are solids which are generally somewhat soluble in many common organic solvents and of varying solubility in water. Thus, the alkali metal products as, for example, potassium hexafluorophosphate, are of low to moderate solubility in water while most of the remaining materials are of low solubility in water. These compounds are adapted to be employed in liquid and dust compositions for growth modification and particularly for the control of the growth of undesired vegetation. It is another advantage of the present invention that when so employed for the control or suppression of undesired vegetation, the present compounds have a high degree of persistency in soil and give excellent controls of many undesirable plant species for periods ranging up to many months.

Representative salts to be employed in the practice of the present invention include the alkali metal, the alkaline earth and heavy metal salts; the alkyl- and alkanolamine salts, heterocyclic amine salts and arylamine salts such as sodium, potassium, lithium, copper, zinc, ammonium, magnesium, barium, calcium, nitrosyl, aniline, benzylamine, monoethanol diisopropanolamine, triethylamine, monobutylamine, morpholine, aminopyridine, hydrazine, piperidine, oxazolidinone and substituted oxazolidinones, pyrrolidinone and substituted pyrrolidinone compounds.

The supplying of a growth-altering amount of at least one of the hexafluoro compounds to plants, plant parts and their habitats is essential and critical for the practice of the present invention. The exact dosage to be supplied is dependent upon the type of effect desired, the plant species to be controlled and the stage of growth thereof as well as the plant part to be contacted with the toxicants. In foliage treatments, good results are obtained when 1.0 to 250 pounds or more of toxicant are applied per acre. In applications to growth media, good results are obtained when a dosage of toxicant is supplied in the amount of from about 5 to 200 parts or more by weight per million parts by weight of the media. In applications to soil, good results are obtained when the hexafluoro compounds are distributed at a rate of from about 0.1 to 250 pounds or more per acre and through such a cross section of the soil as to provide for the presence therein of an effective concentration of the treating agent. In such application, it is desirable that the compound be distributed to a depth of at least 0.5 inch and at a substantially uniformly growth altering dosage of at least 1.0 pound per acre inch of soil.

The method of the present invention can be carried out by applying to plants, plant parts or their habitats the unmodified hexafluoro compounds. However, the present method also preferably embraces the employment of a liquid or dust composition containing the toxicants. In such usage the compounds can be modified with one or a plurality of additaments or herbicide adjuvants such as water, petroleum distillates or other liquid carriers; surface active dispersing agents; and finely divided solids. In compositions where the adjuvant or helper is a finely divided solid, a surface-active agent or the combination of a surface-active agent and a liquid additament, the carrier cooperates with the active component so as to facilitate the invention, and to obtain an improved and outstanding result.

The exact concentration of the hexafluoro compounds to be employed in compositions for application to plants or growth media is not critical and can vary considerably provided the required dosage of effective agent is supplied in the growth media or upon the above-ground surfaces of plants. The concentration of toxicant in liquid compositions employed to supply the desired dosage generally is from about 0.005 to 50 percent by weight, although concentrations as high as 90 percent by weight are sometimes employed. In dusts the concentration of toxicant can be from 0.1 to 20 percent by weight. In compositions to be employed as concentrates, the toxicants can be present in a concentration of from 5 to 98 percent by weight.

The quantity of treating composition to be employed can vary considerably provided that the required dosage of active ingredient is applied in sufficient of the finished composition to cover adequately the vegetation or plant part to be treated or to facilitate the penetration and distribution of the active agent in growth media. The required amount of the active agent in the soil conveniently can be supplied per acre treated in from 40 to 27,000 gallons or more of the liquid carrier or in from 50 to 2000 pounds of the inert solid carrier. In the treatment of seedling weeds, good coverage is obtained when using from 10 to 60 gallons of finished spray composition per acre. Where large succulent vegetation is concerned, it is frequently desirable to employ up to 250 gallons or more of the finished spray composition per acre to assure complete coverage of the above ground portion of the vegetation. In the application of dusts to plant foliage, good results are obtained with from 40 to 2000 pounds of finished dust per acre, the only requirement being that the required toxicant dosage be supplied in sufficient dust to achieve good coverage of the foliage.

Liquid compositions containing the desired amount of active ingredient are prepared by dissolving the toxicants in an organic liquid or by dispersing the toxicants in water with or without the aid of a suitable surface active dispersing agent such as an ionic or non-ionic emulsifying agent. Suitable organic liquid carriers include the agricultural spray oils and the petroleum distillates such as diesel fuel, kerosene, fuel oil, naphthas and Stoddard solvent. Among such liquids the petroleum distillates are generally preferred. The aqueous compositions can contain one or more water immiscible solvents for the toxicant compound. In such compositions, the carrier comprises an aqueous emulsion, i.e., a mixture of water, emulsifying agent and water immiscible solvent. The choice of dispersing and emulsifying agent and the amount thereof employed is dictated by the nature of the composition and by the ability of the agent to facilitate the dispersion of the toxicant compounds in the carrier to produce the desired composition. Dispersing and emulsifying agents which can be employed in the compositions include the condensation products of alkylene oxides with phenols and organic acids, alkyl aryl sulfonates, polyoxyalkylene derivatives or sorbitan esters, complex ether alcohols, mahogany soaps and the like.

In the preparation of dust compositions, the active ingredient is intimately dispersed in and on a finely divided solid such as clay, talc, chalk, gypsum, verniculite fines, perlite, and the like. In one method of achieving such dispersion, the finely divided carrier is mechanically mixed or ground with the hexafluoro compounds.

Similarly, dust compositions containing the toxicant compounds can be prepared with various of the solid surface active dispersing agents such as bentonite, fuller's earth, attapulgite and other clays. Depending upon the proportions of ingredients, these dust compositions can be employed as concentrates and subsequently diluted with additional solid surface active dispersing agents or with chalk, talc, or gypsum and the like to obtain the desired amount of active ingredient in a composition adapted to be employed for the suppression of the growth of the plants. Also, such dust compositions can be dispersed in water, with or without the aid of a dispersing agent, to form spray mixtures.

Satisfactory results are obtained when the toxicants of the present invention, or compositions comprising these toxicants, are combined with other agricultural materials intended to be applied to plants, plant parts, or their habitats. Such materials include fertilizers, fungicides, insecticides, other herbicides, soil conditioning agents, and the like.

When operating in accordance with the present invention, growth altering amounts of the hexafluoro compounds are dispersed in soil or growth media in any convenient fashion. Applications to growth media can be carried out by simply mixing with the media, by applying to the surface of soil and thereafter dragging or discing into the soil to the desired depth or by employing a liquid carrier to accomplish the penetration and impregnation. The application of spray and dust compositions to the surface of soil, or to plant parts or the above ground surfaces of plants can be carried out by conventional methods, e.g., power dusters, boom and hand sprayers and spray dusters, whether surface or air-borne.

In a further method, the distribution of the hexafluoro compounds in soil may be accomplished by introducing the agent in the water employed to irrigate the soil. In such procedures, the amount of water may be varied with the porosity and water holding capacity of the soil to obtain a desired depth of distribution of the agent.

In addition, the present method also comprehends the employment of an aerosol composition containing one or more of the present hexafluoro compounds as an active compound. Such a composition is prepared according to conventional methods wherein the toxicant is dispersed in a solvent, and the resultant dispersion mixed with a propellant in liquid state. Such variables as the particular toxicant to be used and the nature of that which is to be treated will determine the desirability of the solvent and concentration of the toxicant therein. Examples of suitable solvents are water, acetone, isopropanol, and 2-ethoxyethanol.

Illustrative of the hexafluoro compounds to be employed as toxicants according to the present invention are the following:

Morpholine hexafluorophosphate;
tripropylamine hexafluoroarsenate;
ammonium hexafluorophosphate double salt with ammonium fluoride;
aniline hexafluorophosphate;
benzyltrimethylammonium hexafluoroarsenate;
benzyltrimethylammonium hexafluorophosphate;
hydrazine hexafluorophosphate;
ammonium hexafluorophosphate;
sodium hexafluorophosphate;
nitrosyl hexafluorophosphate;
hexafluoroarsenic acid;
trimethylamine hexafluorophosphate;
tetramethylammonium hexafluorophosphate;
ar-trichlorobenzenediazonium hexafluorophosphate;
ar-dichlorobenzenediazonium hexafluorophosphate;
tetraethylammonium hexafluorophosphate;
N,N-dimethylbenzylamine hexafluoroarsenate;
trimethylphenylammonium hexafluorophosphate;
tripropylamine hexafluorophosphate;
N,N-diethylcyclohexylamine hexafluoroarsenate;
N,N-diethylcyclohexylamine hexafluorophosphate;
tetrapropylammonium hexafluorophosphate;
tributylamine hexafluorophosphate;
aniline hexafluoroarsenate;
2,2'-diethyldihexylamine hexafluorophosphate;
hexafluorophosphoric acid;
trimethyloctadecylammonium hexafluorophosphate;
(ar-dodecylbenzyl)trimethylammonium hexafluorophosphate;
benzylhexadecyldimethylammonium hexafluorophosphate;
benzylhexadecyldimethylammonium hexafluoroarsenate;
potassium hexafluorophosphate;
methylamine hexafluorophosphate;
morpholine hexafluoroarsenate;
tert-butylamine hexafluorophosphate;
1,6-hexanediamine bis(hexafluorophosphate);
tripentylamine hexafluorophosphate;
semicarbazide hexafluorophosphate;
3-morpholinopropiophenone hexafluorophosphate;
benzylamine hexafluoroarsenate;
2,6-dimethylmorpholine hexafluorophosphate;
silver hexafluorophosphate;
2-methylaminoethanol hexafluorophosphate;
butylamine hexafluorophosphate;
hexylamine hexafluorophosphate;
diisobutylamine hexafluorophosphate;
ethylenediamine bis(hexafluorophosphate);
2,2'-iminodiethanol hexafluorophosphate;
tripentylamine hexafluoroarsenate;
triisopentylamine hexafluorophosphate;
N,N'-dibutylethylenediamine bis(hexafluorophosphate);
silver hexafluoroarsenate;
N-sec-butylaniline hexafluorophosphate;
N,N'-bis(1-methylheptyl)ethylenediamine bis(hexafluorophosphate);
diethylenetriamine tris(hexafluorophosphate);
3-picoline hexafluorophosphate;
butylamine hexafluoroarsenate;
phenylhydrazine hexafluorophosphate;
benzylamine hexafluorophosphate;
1,4-dimethylpiperidine hexafluorophosphate;
3,3'-diaminodipropylamine bis(hexafluorophosphate), and
4-amino-2-picoline hexafluorophosphate.

Among the salts with organic compounds to be used according to the present invention, the preferred ones are those having a molecular weight not in excess of about 600.

Example 1

In separate operations, aqueous compositions containing the representative hexafluoro compounds mentioned in the preceding paragraphs are prepared as follows.

Four parts by weight of one of the hexafluoro compounds, 0.08 part of sorbitan trioleate (Span 85) and 0.02 part of a sorbitan monolaurate polyoxyethylene derivative (Tween 80) are dispersed in 40 milliliters of acetone to produce a concentrate composition in the form of a water-dispersible liquid containing one of the representative compounds as an active agent. Portions of these concentrate compositions are dispersed in water to provide aqueous compositions containing 0.5 pound of one of the representative compounds per 100 gallons of ultimate aqueous mixture.

Also, the hexafluoro compounds are formulated in water with an alkyl aryl sulfonate (Nacconol NR) and a substituted benzoid alkyl sulfonic acid (Daxad No. 27) to produce aqueous compositions. In such operations, the materials are ballmilled together to produce a composition containing 300 parts by weight of Nacconol NR, 300 parts by weight of Daxad No. 27, and 0.5 pound of one of the representative hexafluoro compounds per 100 gallons of ultimate aqueous mixture.

Portions of the aqueous compositions as prepared on the preceding paragraph are employed for the treatment of seed beds which have been prepared and seeded to Japanese millet. In the treating operations, the compositions are applied to the seed beds as a soil drench and at a rate of about 0.43 acre inch of aqueous composition per acre to supply substantially uniform dosages of 50 pounds of one of the hexafluoro compounds per acre. This dosage corresponds to a concentration of about 82 parts by weight of active compound per million parts by weight of soil. Other seed beds similarly prepared and seeded to Japanese millet are left untreated to serve as checks.

After three weeks the beds are examined to ascertain what percent of kill and control of the growth of Japanese millet seeds and emerging seedlings is obtained. There is found in all the treated beds a substantially complete kill and control of the growth of the seeds and emerging seedlings of Japanese millet. At the time of these observations the check beds are found to support copious and rapidly growing stands of Japanese millet.

Example 2

Portions of the concentrate compositions containing hexafluoroarsenic acid and ammonium hexafluorophosphate and prepared according to the ballmilling procedures in Example 1 are dispersed in water to prepare aqueous spray compositions containing 0.5 pound of one of the active compounds per 100 gallons of ultimate mixture. These spray compositions are employed for the treatment of seed beds which have been prepared and seeded to the various plant species listed below. In the treating operations, the compositions are applied to the soil areas as a soil drench and at a rate of about 0.43 acre inch of aqueous composition per acre to supply substantially uniform dosages of 50 pounds of one of the subject compound per acre. This dosage corresponds to a concentration of about 82 parts by weight of subject compound pe million parts by weight of soil. Other seedbeds similarly prepared and seeded are left untreated to serve as checks. After three weeks, the treated beds are examined to ascertain what control of the gowth of seeds and emerging seedlings is obtained. The plant species employed and results obtained are set forth in the following table.

| Subject compound | Percent kill and control of the growth of seeds and emerging seedlings | | | | |
|---|---|---|---|---|---|
| | Pea | Radish | Corn | Milo (sorghum) | Wild oats |
| Hexafluoroarsenic acid | 60 | 90 | 98 | 100 | 98 |
| Ammonium hexafluorophosphate | 95 | 95 | 95 | 100 | 98 |

At the time of observation, all of the check beds show abundant and vigorously growing stands of the named plant species.

Example 3

Aqueous compositions containing about 0.2 pound of one of the hexafluoro compounds per 100 gallons of ultimate mixture are prepared according to the ballmilling procedures in Example 1. These compositions are employed for the treatment of seed beds which have been prepared and seeded to the various plant species listed below. In the treating operations, the compositions are applied to the seed beds as a soil drench and at a rate of about 0.43 acre inch of aqueous composition per acre to supply a substantially uniform dosage of 20 pounds of subject compound per acre. This dosage corresponds to a concentration of about 32.8 parts by weight of the active compound per million parts by weight of soil. Other beds similarly prepared and seeded are left untreated to serve as checks.

After three weeks, the treated beds are examined to ascertain what control of the growth of seeds and emerging seedlings is obtained. The plant species employed and results obtained are set forth in the following table.

| | Percent kill and control of the growth of seeds and emerging seedlings | | | | | |
|---|---|---|---|---|---|---|
| | Pigweed | German millet | Crabgrass | Meadow fescue | Japanese millet | Wild oats |
| Hexafluorophosphoric acid | 100 | 100 | 98 | 100 | 100 | 99 |
| Tripropylamine hexafluoroarsenate | 100 | 100 | 100 | 100 | 99 | 99 |
| Sodium hexafluorophosphate | 80 | 100 | 99 | 99 | 99 | 98 |
| Tetraethylammonium hexafluorophosphate | 100 | 100 | 95 | 98 | 100 | 98 |
| Trimethylphenylammonium hexafluorophosphate | 100 | 100 | 90 | 95 | 100 | 98 |
| Hexafluorophosphoric acid | 100 | 100 | 98 | 100 | 100 | 99 |

At the time of observation the check beds show abundant and rapidly growing stands of the named plant species.

Example 4

Aqueous compositions each containing 10,000 parts by weight of various hexafluoro compounds per million parts by weight of ultimate mixture are prepared according to the ballmilling procedures in Example 1. These compositions are employed in post emergent applications for the control of various plant species. In the treating operations, the compositions are applied as foliage sprays to plots of the various plants species. At the time of the applications, the plants are from two to four inches in height. The treatments are carried out with conventional spraying equipment, the applications being made to the point of run-off. Such applications correspond to a dosage of about 20 pounds of toxicant per acre. Similar plots of the various plant species are left untreated to serve as checks. After about two weeks, the plots are examined to ascertain what control of the growth of the plants is obtained. The test compounds and plant species employed, together with the results obtained are set forth in the following table.

| Test compound | Percent kill and control of the growth of seedling species | | | | | | |
|---|---|---|---|---|---|---|---|
| | Pigweed | Marigold | Crabgrass | German millet | Cucumber | Pinto beans | Radish |
| Hexafluorophosphoric acid | 100 | 100 | 100 | 100 | 100 | 98 | 100 |
| Tripentylamine hexafluoro arsenate | 100 | 100 | ---------- | 90 | 100 | 99 | 100 |
| Potassium hexafluorophosphate | 100 | 60 | 85 | 100 | 95 | 95 | 80 |
| Silver hexafluoroarsenate | 100 | 100 | 80 | 100 | 95 | 100 | 100 |
| Tripentylamine hexafluorophosphate | 100 | 100 | 100 | 100 | 100 | 100 | 100 |
| Benzylhexadecyldimethylammonium hexafluorophosphate | 100 | 80 | 90 | 95 | 100 | 98 | 100 |
| Potassium hexafluorophosphate | 100 | 60 | 85 | 100 | 95 | 95 | 80 |

At the time of the observations, heavy stands of the named plant species are found in the check plots.

The plots are also infested with the weed grasses, wild oats, Japanese millet, Sudan grass, and meadow fescue: good commercial control of these weeds in the treated plots also results.

Example 5

In separate operations, aqueous compositions containing 5,000 parts by weight of hexafluorophosphoric acid and silver hexafluoroarsenate per million parts of ultimate mixture are prepared according to the ballmilling procedures in Example 1. These compositions are employed in post emergent applications for the modification of the growth of various plant species. The applications are carried out as previously described on plots of plants of from two to four inches in height. Similar beds of the various plant species are left untreated to serve as checks. After two weeks, the plots are examined to ascertain what control of the growth of the plant is obtained. The plant species employed, together with the results of the observations are set forth in the following table.

a dosage of about 32.8 parts by weight of the active agent per million parts of soil. At monthly intervals the seed beds are reprepared and reseeded to the same plant species. At each planting operation, untreated seed beds are similarly planted with the named plant species. Following the initiation of the evaluation, the seed beds are watered every fourth day in an amount corresponding to about three acre inches of rainfall per month. During the intervals between planting operations, observations are carried out to determine what percent kills and controls of the growth of seeds and emerging seedlings are obtained. The results of the observations are set forth in the following table.

| Time of planting expressed as the number of months after treatment of the soil | Percent kill and control of the growth of seeds and emerging seedlings as observed 3 weeks after indicated time of planting | | | |
|---|---|---|---|---|
| | Japanese millet | Radish | Wild oats | Beans |
| 0 | 100 | 95 | 100 | 100 |
| 1 | 100 | 100 | 100 | 95 |
| 2 | 98 | 40 | 95 | 98 |
| 3 | 100 | 40 | 80 | 95 |
| 4 | 98 | 50 | 70 | 75 |
| 5 | 90 | 40 | 50 | 60 |
| 6 | 80 | 30 | 30 | 80 |
| 7 | 98 | 70 | 0 | 60 |
| 8 | 100 | 40 | 0 | 50 |
| 9 | 100 | 50 | ---------- | 90 |
| 10 | 60 | 50 | 0 | 40 |
| 11 | 0 | 0 | 0 | 0 |

| Test Compound | Percent control and kill of the growth of seedling species | | | | | | |
|---|---|---|---|---|---|---|---|
| | Pigweed | Cucumber | Radish | Crabgrass | Pinto bean | Marigold | German millet |
| Hexafluorophosphoric acid | 80 | 100 | 100 | 100 | 98 | 100 | 100 |
| Silver hexafluoroarsenate | 100 | 95 | 100 | 40 | 80 | 100 | 100 |

At the time of the observations, profuse and rapidly growing stands of the named plant species are found in the check plots.

Example 6

An aqueous composition containing 0.5 pound of tripropylamine hexafluorophosphate per 100 gallons of ultimate mixture is prepared according to the ballmilling procedures of Example 1. This composition is employed to treat seed beds of sandy loam soil of good nutrient content which have been prepared and seeded to Japanese millet, radish, beans and wild oats. In the treating operations, the composition is applied as a soil drench and at a rate of 0.43 acre inch of aqueous composition per acre to supply a substantially uniform dosage of 20 pounds of the subject compound per acre. This corresponds to At the time of the observations, the corresponding check plants are found to support lush and abundant stands of the named plant species.

The salts to be employed according to the present invention are prepared in known methods. Thus, for example, the alkali metal and ammonium salts are prepared by the reaction of the acids and, respectively, alkali metal and ammonium hydroxides. The alkaline earth metal salts and heavy metal salts are prepared by reacting a halide or sulfate of, respectively, an alkaline earth metal and a heavy metal with the corresponding hexafluoroarsenate or hexafluorophosphate salt of an alkali metal in a metathesis reaction. The amine salts are prepared in the neutralization reaction of an amine compound and one of the acids. In alternate methods, the amine salts are prepared by the metathesis reaction of the amine hydrohalide and one of the acids, or by the metathesis reaction of the amine hydrohalide and alkali metal hexafluoroarsenate or hexafluorophosphate. The preparation of the salt compounds is conveniently carried out in water as reaction medium and takes place at temperatures of from 0° to 50° C.

What is claimed is:

1. The method which comprises applying to plants and plant parts and their habitats a growth inhibiting amount of a hexafluoro compound selected from the group consisting of hexafluoroarsenic acid and hexafluorophosphoric acid, and their salts.

2. The method of claim 1 wherein the hexafluoro compound is hexafluoroarsenic acid.

3. The method of claim 1 wherein the hexafluoro compound is hexafluorophosphoric acid.

4. The method of claim 1 wherein the hexafluoro compound is potassium hexafluorophosphate.

5. The method of claim 1 wherein the hexafluoro compound is potassium hexafluoroarsenate.

6. The method of claim 1 wherein the hexafluoro compound is ammonium hexafluorophosphate.

7. The method of claim 1 wherein the hexafluoro compound is tripropylamine hexafluoroarsenate.

References Cited by the Examiner

UNITED STATES PATENTS 2,488,298   11/49   Lange et al. _____ 23—129

FOREIGN PATENTS 499,529   1/39   Great Britain.

OTHER REFERENCES

Cook et al., Chemical Weed Killers, Bulletin No. 18, Canada (1937), pages 23 and 30 to 36.

King, "Chemicals Evaluated as Insecticides and Repellents," Agriculture Handbook No. 69, May 1954, pages 4, 5, 6 and 174.

Kolditz et al., Chemical Abstracts, vol. 52, Cols. 8819 (g) to 8820 (g), (1958).

JULIAN S. LEVITT, Primary Examiner.

LEWIS GOTTS, Examiner.